(12) United States Patent
Chisaka et al.

(10) Patent No.: US 8,404,073 B2
(45) Date of Patent: Mar. 26, 2013

(54) DECORATIVE SHEET WITH DIFFERENT BEADS IN DIFFERENT LAYERS

(75) Inventors: Hajime Chisaka, Hatano (JP); Mamoru Kanno, Sagae (JP)

(73) Assignee: 3M Innovative Properties Company, Saint Paul, MN (US)

( * ) Notice: Subject to any disclaimer, the term of this patent is extended or adjusted under 35 U.S.C. 154(b) by 813 days.

(21) Appl. No.: 12/293,565

(22) PCT Filed: Mar. 22, 2007

(86) PCT No.: PCT/US2007/064667
§ 371 (c)(1),
(2), (4) Date: Sep. 19, 2008

(87) PCT Pub. No.: WO2007/109763
PCT Pub. Date: Sep. 27, 2007

(65) Prior Publication Data
US 2010/0166997 A1    Jul. 1, 2010

(30) Foreign Application Priority Data
Mar. 22, 2006    (JP) ................... 2006-077999

(51) Int. Cl.
| B29C 65/00 | (2006.01) |
| B31B 1/60  | (2006.01) |
| B32B 37/00 | (2006.01) |
| B32B 9/00  | (2006.01) |
| B32B 33/00 | (2006.01) |
| B32B 1/00  | (2006.01) |
| B32B 3/00  | (2006.01) |
| B24D 11/00 | (2006.01) |

(52) U.S. Cl. .......... 156/279; 156/60; 428/40.1; 428/187
(58) Field of Classification Search .................. 156/60, 156/279; 428/40.1, 187
See application file for complete search history.

(56) References Cited

U.S. PATENT DOCUMENTS

| 5,169,704 A | 12/1992 | Faust et al. |
| 6,428,875 B1 | 8/2002 | Takahashi et al. |
| 2004/0146706 A1* | 7/2004 | Kasai et al. ............ 428/328 |

FOREIGN PATENT DOCUMENTS

| EP | 0 985 525 | 3/2000 |
| JP | 5104695 | 4/1993 |
| JP | 6-55900 | 3/1994 |
| JP | 7119281 A | 5/1995 |
| JP | 8132583 A | 5/1996 |
| JP | 8-174785 | 7/1996 |
| JP | 8-174785 A | 7/1996 |
| JP | 2001-260299 | 9/2001 |
| JP | 2005-193484 | 7/2005 |

* cited by examiner

*Primary Examiner* — Michael Orlando

(57) ABSTRACT

A durable decorative sheet high in the ability to follow a curved surface with small appearance change by heat or elongation. A decorative sheet comprising a transparent resin film having two main surfaces, a transparent resin layer formed on the first main surface of the transparent resin film, a pattern printed layer arranged on the transparent resin layer, and a colored base film arranged on the second main surface of the transparent resin film. The transparent resin layer includes first beads, the pattern printed layer include second beads. The first beads are different from the second beads in content, color and/or particle size. The first beads and the second beads are embedded in the transparent resin layer and the pattern printed layer.

20 Claims, 1 Drawing Sheet

DECORATIVE SHEET WITH DIFFERENT BEADS IN DIFFERENT LAYERS

CROSS REFERENCE TO RELATED APPLICATIONS

This application is a national stage filing under 35 U.S.C. 371 of PCT/US2007/064667, filed Mar. 22, 2007, which claims priority to Japan Application No. 2006-077999, filed Mar. 22, 2006, the disclosure of which is incorporated by reference in its/their entirety herein.

This invention relates to a thermally moldable decorative sheet hardly changed in appearance by heat or elongation, a method of preparing the same and a molded part having the decorative sheet.

BACKGROUND

In the prior art, a wood-like decorative sheet having a figured grain is used as a surface material of the furniture, building, ceiling and floor. As shown in FIG. 1, the conventional ordinary wood-like decorative sheet 11 is fabricated in such a manner that a grain pattern portion 13 and a vessel pattern portion 14 are printed by rotary photogravure on one surface of a colored base film layer 12, and by laying a transparent film 15 on this assembly, a thermal lamination is conducted so that the transparent film 15 is bonded to the colored base film layer 12 while at the same time embossing the uppermost surface of the transparent film thereby to form an embossed depression 16. Also, the surface of the colored base film opposite to the surface thereof printed with the grain has an adhesive layer 17 and a release sheet 18 for attachment to the base material (See Japanese Unexamined Patent Publication No. 2001-260299, for example).

The grain pattern is defined as a pattern representing an annual ring, cross grain or straight grain in the cross section of a natural lumber, and the vessel pattern as a pattern of vessels for sending the moisture and nutrients absorbed from the root to the upper portion in a plant tissue. The vessel pattern is a more detailed design than the grain pattern. Generally, the grain pattern of the natural lumber is the collective name of the annual ring, the cross grain and the straight grain. In this specification, however, the grain pattern and the vessel pattern are discriminated from each other as described above.

In the wood-like decorative sheet described above, the stereoscopic appearance is created by reproducing the cross section of vessels by forming an embossed depression on the surface thereof. The physical roughness formed on the decorative sheet by thermally embossing the surface thereof to create the quality sense such as the grain, however, disappears when the decorative sheet is used in an environment higher than 70° C. in temperature or in an elongated form. This decorative sheet, therefore, finds no suitable applications in producing a thermally molded part heated at the time of attachment or the interior of automobiles used in a high temperature environment.

A method has been proposed in which a frosted transparent coat layer containing particles of a frosting agent in the transparent resin is formed on the surface of a base material to hold the embossed state (See Japanese Patent No. 3150439). In order to reproduce a low gloss of not more than 10, however, the content of the frost agent particles is required to be increased, in which case the holding power of the resin is reduced, with the result that the particles of the frosting agent easily come off or are easily separated and a sufficient performance cannot be exhibited.

A conventional case has also been proposed which uses a thermosetting resin to improve the surface performance of the decorative sheet (See Japanese Patent No. 3576237, for example). Due to the bridging structure of the thermosetting resin, however, no elongation is exhibited in the thermal molding process and the stress often remains after molding with the result that the spring back is inconveniently caused after attachment, thereby making impossible the application in the three-dimensional molding process.

SUMMARY

The present invention is able to solve one or more of the problem points described above. An object of the present invention can be to provide a decorative sheet in which the appearance of the frost and embossed pattern is not substantially changed by heat or elongation and which can be designed for a grain, rift or metal texture with a high ability to follow a curved surface.

According to a first aspect of the invention, there is provided a decorative sheet comprising a transparent resin film having two main surfaces, a transparent resin layer formed on the first main surface of the transparent resin film, a pattern printed layer arranged on the transparent resin layer and a colored base film arranged on the second main surface of the transparent resin film, wherein the transparent resin layer includes first beads, the pattern printed layer includes second beads, the first beads are different from the second beads in content, color and/or particle size, and the first beads and the second beads are embedded in the transparent resin layer and the pattern printed layer.

According to a second aspect of the invention, there is provided a method for preparing a decorative sheet, comprising the steps of forming a transparent resin layer containing first beads on a first main surface of a transparent resin film, forming a pattern printed layer containing second beads on the transparent resin layer, and forming a colored base film on a second main surface of the transparent resin film by thermally laminating the colored base film on the transparent resin film, wherein the first beads are different from the second beads in content, color and/or particle size.

According to a third aspect of the inventive, there is provided a molded part having the decorative sheet described above.

In the decorative sheet according to the present invention, the transparent resin layer having the first beads and the printed layer having the second beads are formed on the surface thereof, and the first beads are different from the second beads in content, color and/or particle size. A pattern is formed, therefore, by the contrast between these two layers. This contrast is held against the sheet elongation by heat or also against the thermal molding of the sheet into a three-dimensional shape, thereby holding the appearance of high design quality. Further, in view of the fact that these beads are embedded in the transparent resin layer and the pattern printed layer, a durable decorative sheet is provided which is highly resistant to the rubbing by friction, etc.

DETAILED DESCRIPTION

Figure 1:
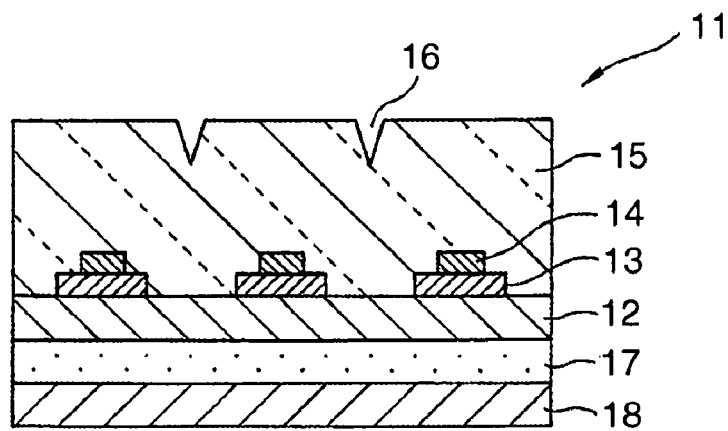
FIG. 1 is a sectional view of a conventional decorative sheet.
Figure 2:
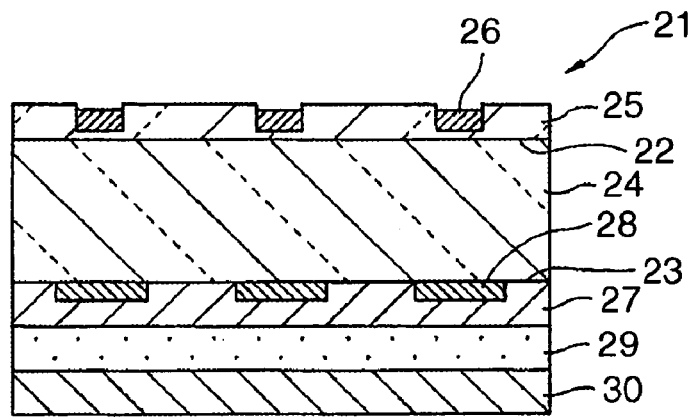
FIG. 2 is a sectional view of a decorative sheet according to the present invention.

A decorative sheet according to the invention is explained below with reference to the drawings. As shown in FIG. 2, the decorative sheet 21 according to the first aspect of the invention comprises a transparent resin film 24 having two main surfaces 22, 23, a transparent resin layer 25 formed on the first main surface 22 of the transparent resin film 24, a pattern printed layer 26 arranged on the transparent resin layer 25, and a colored base film layer 27 formed on the second main surface of the transparent resin film 24. Specifically, the decorative sheet according to this aspect of the invention is configured of, stacked in order from the surface thereof, the pattern printed layer 26, the transparent resin layer 25, the transparent resin film 24 and the colored base film 27. Also, preferably, a second pattern printed layer 28 is arranged between the second main surface 23 of the transparent resin film 24 and the colored base film 27. More preferably, an adhesive layer 29 and a release sheet 30 are stacked for attachment to the base material.

The transparent resin film 24 may be composed of any of various synthetic resins including polyvinyl chloride, fluoro resin, polyurethane resin, polyester resin, polyolefin resin and acrylic resin. From the viewpoint of workability, processability and fabrication cost, however, polyvinyl chloride resin is preferable. Also, the transparent resin film 24 is required to have a transparency to such a degree as to be observable through at least the underlying colored base film and, in some cases, the second pattern layer. The thickness of the transparent resin film 24 may be about 20 to 300 μm, or preferably, about 40 to 150 μm. An excessively small thickness would lead to an insufficient strength of the decorative sheet and an insufficient stereoscopic appearance of the printed pattern of the pattern layer 26 arranged on the film 24. An excessive large thickness, on the other hand, would fail to produce the desired stereoscopic appearance on the one hand and pose the problem of low workability, low transportability, high cost and low processability of the base material.

The transparent resin layer 25, like the transparent resin film 24, may be formed of any of various synthetic resins including polyvinyl chloride, fluoro resin, polyurethane resin, polyester resin, polyolefin resin and acrylic resin. Further, the material of the transparent resin layer 25 may or may not be the same as that of the transparent resin film 24.

The pattern printed layer 26 is printed in a predetermined pattern representing a predetermined figure. The binder resin of the ink used for printing the pattern printed layer includes the well-known polyvinyl chloride-vinyl acetate-based, polyester resin-based, polyolefin resin-based, polyurethane resin-based, acryl-based or cellulose-based binder resin, or amino alkyd resin, urethane resin, unsaturated polyester resin, epoxy resin, acryl resin or the like thermosetting, photo-cured, electron radiation-cured resin.

The colored based film 27, on the other hand, is to give the color for the base of the decorative sheet, and formed of polyvinyl chloride-vinyl acetate-based or polyester resin-based, polyolefin resin-based, polyurethane resin-based, acryl-based or cellulose-based thermoplastic resin with a pigment added thereto to give a predetermined color.

In the decorative sheet according to this invention, though not shown in FIG. 2, the first beads are mixed in the transparent resin 25, and the second beads in the pattern printed layer 26. These beads can be formed of resin beads of acryl resin, polyamide resin, silicone resin, polyurethane resin, polyethylene resin or melamine resin, or inorganic beads such as mica, silica, alumina, calcium carbonate, silica sand or glass. The materials of the first and second beads may or may not be the same.

The size of the beads in terms of average particle diameter is preferably 5 to 50 μm or more preferably about 10 μm. A particle size larger than this range would make it impossible to embed the beads sufficiently in the transparent resin layer and a fine pattern cannot be formed as described below. An excessively small particle size, on the other hand, could not form a line making up the pattern nor produce a sufficient strength.

The beads are contained in the transparent resin layer or the pattern printed layer in such a manner that the content of the beads is 3:35 to 4:5 in terms of the volume ratio between the beads and the transparent resin or the binder resin. The volume ratio of 17:50 is especially preferable. The thickness of the transparent resin layer 15 and the pattern printed layer 26, though not specifically limited, is varied with the particle size of the beads mixed and the added amount thereof, and normally about 5 to 50 μm.

Further, this invention is characterized in that the first beads in the transparent resin layer 25 are different in content, color and/or particle size from the second beads in the pattern printed layer 26. For example, the first beads are arranged uniformly in the transparent resin layer 25, and the pattern printed layer 26 containing the second beads are arranged locally on the transparent resin layer thereby to change the content. As an alternative, transparent beads are used as the first beads, and colored beads as the second beads. Further, beads having the particle size of 10 μm are used as the first beads, and beads having the particle size of 20 μm are used as the second beads. Due to the difference in content, color and/or particle size between the first and second beads, a pattern is formed by the contrast between the two layers, i.e. the transparent resin layer 25 and the pattern printed layer 26 containing the beads, respectively. This contrast is held against the sheet elongation due to heat and the process of thermal molding into a three-dimensional shape thereby making it possible to hold the appearance of high design quality. Further, in view of the fact that the beads are embedded in the transparent resin layer and the pattern printed layer, a durable decorative sheet can be produced which is strong against the rubbing by friction.

The beads in the pattern printed layer 26 are preferably colored by themselves. This coloring is carried out by mixing various pigments of black, red, brown or yellow in the beads to reproduce the target pattern color.

A second pattern printed layer 28 is preferably arranged between the second main surface 23 of the transparent resin film 24 and the colored base film 27. This second pattern printed layer is formed by printing a predetermined pattern on the second main surface 23 of the transparent resin film 24 or the colored base film 27 by normal gravure or screen printing process using the multipurpose printing ink containing the well-known pigment and the well-known binder resin such as polyvinyl chloride-vinyl acetate, acryl or cellulose group. This second pattern printed layer 28 may be formed wholly or partly on the second main surface of the transparent resin film. In the case where a metal glossy layer is formed over the whole surface, for example, a decorative sheet having the appearance of a metal foil can be produced, while the provision of a rift pattern layer produces a decorative sheet having the appearance of a stone plate. Also, the provision of a layer of grain pattern can produce a decorative sheet having the appearance of a grain plate. The thickness of the second pattern printed layer 28 is not specifically limited, and normally in the range of about 0.1 to 30 μm. The ink used for this printing process may have added thereto a pearl pigment, metal powder or the like brightening pigment to reproduce the grain brightness, improve the stereoscopic appearance of the grain or giving a metal gloss.

Further, in the decorative sheet according to this invention, the adhesive layer 29 and the release sheet 30 for attachment on the base material are preferably arranged on the back of the decorative sheet, i.e. on the back of the colored base film opposite to the transparent resin film. As a result, the decorative sheet can be easily attached on the surface of an industrial product, the wall surface of a building, the construction part of the ceiling surface or the interior member of an automobile. This adhesive layer is formed as a coating, for example, on the release surface of the release sheet. An adhesive layer with a release sheet is prepared and the adhesive layer and the colored base film are arranged by dry lamination. The adhesive layer is formed of acrylic adhesive, rubber-based adhesive or silicone-based adhesive.

This adhesive layer 29 preferably includes grooves. The provision of these grooves efficiently excludes the air remaining between the surface of the base material and the decorative sheet at the time of attaching the decorative sheet on the base material, and prevents the decorative sheet from being raised. This is effective especially in the case where the decorative sheet is attached on a curved surface of the base material. These grooves are more preferably cross-communicating meshed grooves and these communicating grooves are formed by using a sheet having protrusions corresponding to the communicating grooves as a release sheet and stacking the release sheet on the adhesive layer in such a manner as to allow the protrusions to intrude into the adhesive layer.

The decorative sheet according to this invention is fabricated as described below, for example. First, a transparent resin containing the first beads is coated on the first main surface of the transparent resin film 24 by the normal coating process such as the roll coating process or the spin coating process, and dried to form the transparent resin layer 25. Then, the pattern printed layer 26 containing the second beads are formed on the transparent resin layer 25 by gravure printing or screen printing. In similar fashion, the second pattern printed layer is formed on the second main surface opposite to the first main surface of the transparent resin film formed with the transparent resin layer.

Figure 3:
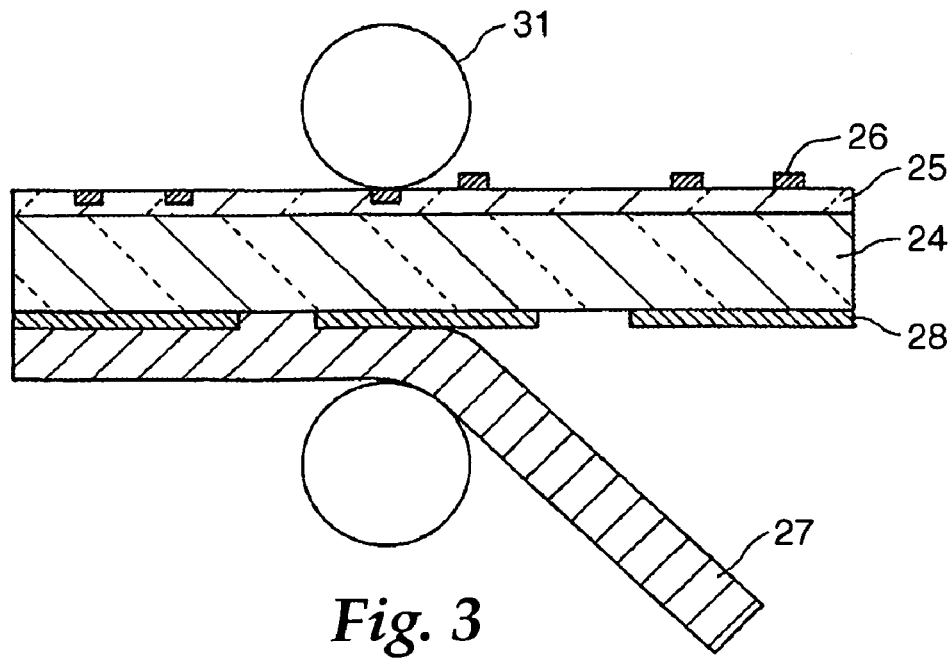
FIG. 3 is a diagram showing a preparation process of a decorative sheet according to the present invention.

Next, as shown in FIG. 3, the transparent resin film 24 and the colored base film 27 arranged on the second main surface of the transparent resin film are passed through an embossing roll 31 to thermally laminate the colored base film 27 on the transparent resin film 24. The transparent resin layer 25 and the pattern printed layer 26 on the transparent resin film 24 are heated when passing the transparent resin film 24 through the embossing roll 31, so that the pattern printed layer 26 is embedded in the transparent resin layer 25. The transparent resin layer 25 and the pattern printed layer 26 contain beads. Preferably, the beads are embedded in the transparent resin layer 25 and the pattern printed layer 26 under the pressure applied by the embossing roll at the same time, though they are not described in FIG. 3.

In FIG. 3, the colored base film 27 is thermally sealed and the transparent resin film 24 is embossed at the same time. Nevertheless, these processes may be carried out separately. Specifically, the colored base film 27 is thermally sealed on the transparent resin film 24, after which the transparent resin film 24 is embossed, or in the reverse order.

By attaching the decorative sheet according to the invention obtained in this way on the base material, a molded part with the decorative sheet is produced. The decorative sheet can be attached on the base material by a method generally employed. Preferably, however, a vacuum lamination method is used in which the base material is placed in a molding chamber in the vacuum molding machine and the decorative sheet is arranged with the adhesive layer directed toward the base material while vacuum is introduced so that the decorative sheet is attached in close contact with the base material.

EXAMPLES

The waterborne urethane resin solution (Leathermin D6200 of Dainichiseika Color & Chemical Mfg. Co., Ltd.) is coated and dried to the thickness of 40 μm on a PET film to produce a transparent resin film. Then, acrylic resin beads (Rubcolor 030, M10, average particle size of 10 μm, of Dainichiseika Color & Chemical Mfg. Co., Ltd.) are added in the solution of polyvinyl chloride-vinyl acetate clear ink (VSA880 medium, solid portion 20%, of Dainichiseika Color & Chemical Mfg. Co., Ltd.) in volume ratios of 1:0.85, 1:0.68, 1:051, 1:0.34 and 1:021 and coated and dried to produce a resin portion 5 μm thick. In this way, a uniform transparent resin layer is formed on the surface of the transparent resin film.

Next, the black colored acrylic resin beads (Rubcolor 020, M20(F) black, average particle size 20 μm, of Dainichiseika Color & Chemical Mfg. Co., Ltd.) are added to the polyvinyl chloride-vinyl acetate clear ink solution in the volume ratio of 1:1, thereby forming a pattern printed layer of vessel pattern by gravure printing on the transparent resin layer.

On the other hand, a second pattern printed layer having a grain pattern is formed by three-color gravure printing on one side of a white colored amorphous polyester resin film 80 μm thick used as a colored base film.

The transparent resin film and the colored base film are thermally laminated (by IR heater at 500° C.), while at the same time being embossed (sand emboss roll) thereby to fabricate a wood-like decorative sheet having a vessel pattern.

Next, an acrylic adhesive (SK1310 of Soken Chemical) is coated and dried to the thickness of 35 μm on a liner of MicroComply having a protrusion 197 μm in pitch and 10 μm tall, and the resulting adhesive layer is attached on the colored base film of the wood-like decorative sheet thereby to fabricate a decorative sheet with adhesive. The decorative sheet thus obtained is thermally molded at 120° C. and attached on a hemispherical surface 200 mmφ.

The surface gloss of the decorative sheet before and after thermal molding is measured by the 60° C. Gloss Meter GMX-203 of Murakami Color Technical Research), as the measurement result thereof is shown in Table 1. Also, the surface performance of the decorative sheet before thermal molding is compared, by the wear resistance test, with that of the sheet fabricated by attaching the transparent resin film and the colored base film to each other without impression by thermal embossing, as the result thereof is shown in Table 2. This wear resistance test was conducted using a taper wear tester in accordance with JIS K7204. Specifically, a CS-17 truck wheel is placed on the wood-like decorative sheet and thus a load of 1 kg is imposed thereon, after which the wood-like decorative sheet is rotated. Under this condition, the rotational number required before disappearance of the pattern printed layer (vessel pattern portion) is measured to evaluate the wear resistance.

The below Table 1 provides differences of the surface gloss of the decorative sheet before and after thermal molding

TABLE 1

| Amount of Beads (Volume %) | 60° Gloss | | | Gloss Difference | Judgment |
| --- | --- | --- | --- | --- | --- |
| | Before Emboss | After Emboss | After Thermal Molding | | |
| 0% | — | 10.9 | 92.9 | 82.0 | disapprove |
| 85% | 1.7 | 1.5 | 1.5 | 0.0 | excellent |
| 68% | 2.0 | 1.9 | 2.2 | 0.3 | excellent |
| 51% | 5.4 | 3.0 | 7.1 | 4.1 | excellent |
| 34% | 6.9 | 4.2 | 12.2 | 8.0 | excellent |
| 21% | 22.6 | 7.0 | 30.8 | 23.8 | good |

Table 2 provides results of wear resistance testing of the 68% beads amount.

TABLE 2

| With emboss | disappeared at 200 rotations |
| --- | --- |
| without emboss | disappeared at 10 rotations |

By adding the beads to the transparent resin layer as described above, the gloss difference before and after thermal molding is found to be smaller than in the case where the surface roughness is formed only by thermal embossing. By forming a surface roughness using this invention, a design intended at the time of sheet fabrication can be reproduced after thermal molding and during the use in a high-temperature environment. Thus, the invention can provide a product useful as a decorative sheet for thermal molding, or especially a decorative sheet used by being attached on the automotive interior parts exposed to a high-temperature environment. Also, the sheet according to the invention has a superior wear resistance.

What is claimed is:

1. A method for preparing a decorative sheet, said method comprising:
   forming a transparent resin layer containing first beads on a first main surface of a transparent resin film,
   embedding a pattern printed layer containing second beads into the transparent resin layer, and
   forming a colored base film on a second main surface of the transparent resin film by thermally laminating the colored base film on the transparent resin film,
   wherein both the first and second beads are colored, and the content, color and/or the particle size of the first beads are different from those of the second beads.

2. The method as set forth in claim 1, wherein a pattern is formed by the contrast between the transparent resin layer and the pattern printed layer, and the appearance of this contrast hardly changes when exposed to the heating and elongation of a thermal molding process.

3. The method as set forth in claim 2, wherein a second pattern printed layer is formed between the second main surface of the transparent resin film and the colored base film.

4. The method as set forth in claim 2, comprising an adhesive layer and a release sheet in that order on the surface of the colored base film opposite to the surface thereof in contact with the transparent resin film.

5. The method as set forth in claim 3, comprising an adhesive layer and a release sheet in that order on the surface of the colored base film opposite to the surface thereof in contact with the transparent resin film.

6. The method as set forth in claim 3, wherein grooves are formed on the surface of the adhesive, in contact with the release sheet, that allow air to bleed out from behind the decorative sheet when applied to a surface.

7. The method as set forth in claim 2, wherein the volume ratio between the first beads and the transparent resin in the transparent resin layer is 3:35 to 4:5.

8. The method as set forth in claim 2, wherein the amount of first beads in the transparent resin layer is 21 to 85 volume percent.

9. The method as set forth in claim 2, wherein the volume ratio between the second beads and the resin in the pattern printed layer is 3:35 to 4:5.

10. The method as set forth in claim 7, wherein the volume ratio between the second beads and the resin in the pattern printed layer is 3:35 to 4:5.

11. The method as set forth in claim 8, wherein the volume ratio between the second beads and the resin in the pattern printed layer is 3:35 to 4:5.

12. The method as set forth in claim 2, wherein the pattern printed layer is embedded in the transparent resin layer such that the transparent resin layer does not cover over the pattern printed layer.

13. The method as set forth in claim 3, wherein the pattern printed layer is embedded in the transparent resin layer such that the transparent resin layer does not cover over the pattern printed layer.

14. The method as set forth in claim 4, wherein the pattern printed layer is embedded in the transparent resin layer such that the transparent resin layer does not cover over the pattern printed layer.

15. A method of making a molded part comprising the method as set forth in claim 2.

16. A method of making a molded part comprising the method as set forth in claim 3.

17. A method of making a molded part comprising the method as set forth in claim 12.

18. The method of making a molded part as set forth in claim 15, wherein the decorative sheet is thermally molded in a three-dimensional curved shape.

19. The method of making a molded part as set forth in claim 17, wherein the decorative sheet is thermally molded in a three-dimensional curved shape.

20. A method of fabricating a decorative sheet as set forth in claim 1, wherein a second pattern printed layer is formed on a second main surface of the transparent film, and the colored base film is thermally laminated on the transparent resin film.

* * * * *